US006887517B1

(12) United States Patent
Cook et al.

(10) Patent No.: US 6,887,517 B1
(45) Date of Patent: May 3, 2005

(54) SURFACE MODIFIED PARTICLES BY MULTI-STEP MICHAEL-TYPE ADDITION AND PROCESS FOR THE PREPARATION THEREOF

(75) Inventors: Ronald Lee Cook, Lakewood, CO (US); Brian John Elliott, Superior, CO (US); Silvia DeVito Luebben, Golden, CO (US); Andrew William Myers, Arvada, CO (US); Bryan Matthew Smith, Boulder, CO (US)

(73) Assignee: TDA Research, Wheat Ridge, CO (US)

( * ) Notice: Subject to any disclaimer, the term of this patent is extended or adjusted under 35 U.S.C. 154(b) by 120 days.

(21) Appl. No.: 10/171,422

(22) Filed: Jun. 12, 2002

(51) Int. Cl.[7] .............................. B05D 1/36; B32B 1/00

(52) U.S. Cl. ...................... 427/214; 427/215; 427/220; 428/402; 428/403; 428/404; 428/407

(58) Field of Search ................................ 428/404, 407, 428/403; 427/214, 215, 220

(56) References Cited

U.S. PATENT DOCUMENTS

| | | | |
|---|---|---|---|
| 3,117,944 A | 1/1964 | Harrell | 260/41 |
| 3,268,295 A | 8/1966 | Armbrust, Jr. et al. | 23/141 |
| 3,411,876 A | 11/1968 | Michel et al. | 23/143 |
| 3,411,877 A | 11/1968 | Michel et al. | 23/143 |
| 3,515,689 A * | 6/1970 | Brane et al. | 106/262 |
| 3,901,845 A | 8/1975 | Newbould | 260/37 N |
| 3,997,476 A | 12/1976 | Cull | 252/463 |
| 4,010,247 A | 3/1977 | Wassermann et al. | 423/626 |
| 4,091,164 A | 5/1978 | Schwarz | 428/404 |
| 4,169,014 A | 9/1979 | Goldberg | 435/182 |
| 4,211,667 A | 7/1980 | Yamada et al. | 252/313 R |
| 4,327,032 A | 4/1982 | Lohse et al. | 260/448 |
| 4,349,389 A | 9/1982 | Schofield | 106/308 |
| 4,420,341 A | 12/1983 | Ferrigno | 106/308 |
| 4,496,714 A | 1/1985 | Murata et al. | 528/272 |
| 4,532,072 A | 7/1985 | Segal | 252/313.1 |
| 4,676,928 A | 6/1987 | Leach et al. | 252/313.1 |
| 4,764,495 A | 8/1988 | Rice | 502/62 |
| 4,900,767 A | 2/1990 | Rice | 523/205 |
| 4,929,589 A * | 5/1990 | Martin et al. | 502/406 |
| 4,952,634 A | 8/1990 | Grossman | 525/190 |
| 4,992,199 A | 2/1991 | Meyer et al. | 252/180 |
| 5,212,261 A | 5/1993 | Stierman | 525/506 |
| 5,418,298 A | 5/1995 | Laine et al. | 525/389 |
| 5,593,654 A | 1/1997 | Decker, Jr. et al. | 423/625 |
| 5,593,781 A | 1/1997 | Nass et al. | 428/403 |
| 5,814,407 A * | 9/1998 | Richard et al. | 428/404 |
| 6,207,130 B1 | 3/2001 | Kareiva et al. | 423/600 |
| 6,224,846 B1 | 5/2001 | Hurlburt et al. | 423/625 |
| 6,228,903 B1 | 5/2001 | Beall et al. | 523/209 |
| 6,322,890 B1 | 11/2001 | Barron et al. | 428/402 |
| 6,369,183 B1 | 4/2002 | Cook et al. | 528/10 |
| 6,602,933 B1 * | 8/2003 | Tang et al. | 523/212 |

FOREIGN PATENT DOCUMENTS

EP 0576695 A 1/1994

| | | |
|---|---|---|
| GB | 2039913 A | 8/1980 |
| WO | 9321197 A | 10/1993 |
| WO | 9626240 A | 8/1996 |
| WO | 97/23288 | 7/1997 |
| WO | 9950203 A | 10/1999 |
| WO | 00/09578 | 2/2000 |

OTHER PUBLICATIONS

K. Andrianov et al., *Synthesis of New Polymers with Inorganic Chains of Molecules,* Journal of Polymer Science, vol. XXX, pp. 513–524, 1958.

A. Apblett et al., *Systhesis and Characterization of Triethylsiloxy–Substituted Alumoxanes: Their Structural Relationship to the Minerals Boehmite and Diaspore,* Chemistry of Materials 4(1):167–182, 1992.

A. Apblett et al., *From Minarals to Materials: A Facile Synthetic Route to Preceramic Polymers for Aluminum Oxide,* Materials Research Society Symposium Proceedings, vol. 249, pp 75–80, 1992.

R.S. Bauer, *Epoxy Resins,* ACS Symp. Ser. 285, Applied Polymer Science, II Edition, Roy W. Tess and G. W. Poehlein, Editors, ACS, Washington, pp. 931–961, 1985.

R. Callender et al., *Aqueous Synthesis of Water–Soluble Alumoxanes: Environmentally Benign Precursors to Alumina and Aluminum–Based Ceramics,* Chemistry of Materials 9(11):2418–2433, 1997.

J.M.G. Cowie, *Polymers: Chemistry and Physics of Modern Material,* Intertext Books, Aylesbury, pp 1–23, 1973.

J.H.W. deWit et al., *Evaluation of Coatings—A Total System Approach,* Materials Science Forum, vol. 247, pp 69–82, 1997.

B. Ellis, *Chemistry and Technology of Epoxy Resins,* Blackie Academic & Professional, Chapter 1,2,4 & 7, pp 1–71, 117–143, 206–255, 1993.

A. Gusev et al., *Rational Design of Nanocomposites for Barrier Applications,* Advanced Materials 13(21):1641–1643, Nov. 2001.

(Continued)

Primary Examiner—Monique R. Jackson
(74) Attorney, Agent, or Firm—Greenlee, Winner and Sullivan, P.C.

(57) ABSTRACT

A new class of surface modified particles and a multi-step Michael-type addition surface modification process for the preparation of the same is provided. The multi-step Michael-type addition surface modification process involves two or more reactions to compatibilize particles with various host systems and/or to provide the particles with particular chemical reactivities. The initial step comprises the attachment of a small organic compound to the surface of the inorganic particle. The subsequent steps attach additional compounds to the previously attached organic compounds through reactive organic linking groups. Specifically, these reactive groups are activated carbon—carbon pi bonds and carbon and non-carbon nucleophiles that react via Michael or Michael-type additions.

51 Claims, 3 Drawing Sheets

OTHER PUBLICATIONS

J. Hauck, *Thermal Conductivity of Epoxy Resin–Aluminium (0 to 50%) Composites,* Journal of Materials Science 12 Letters, pp. 1689–1691, 1977.

H. Jullien et al. *The Microwave Reaction of Phenyl Glycidyl Ether with Aniline on Inorganic Supports: A Model for the Microwave Crosslinking of Epoxy Resins,* Polymer 37(15):3319–3330, 1996.

A. Kareiva et al., *Carboxylate–Substituted Alumoxanes as Processable Precursors to Transition Metal–Aluminum and Lanthanide–Aluminum Mixed–Metal Oxides: Atomic Scale Mixing via a New Transmetalation Reaction,* Chemistry of Materials 8(9):2331–2340, 1996.

R. Kasemann et al., *Coatings for Mechanical and Chemical Protection Based on Organic–Inorganic Sol–Gel Nanocomposites,* New Journal of Chemistry 18(10):1117–1123, 1994.

H. Katz et al. *Handbook of Fillers and Reinforcements for Plastics,* Van Nostrand Reinhold Company, pp. 11–50, 1978.

Y. Kimura et al., *Coordination Structure of the Aluminum Atoms of Poly(Methylaloxane), Poly(Isopropoxylaloxane) and Poly[(Acyloxy)Alaxane],* Polyhedron 9(2/3):371–376, 1990.

Y. Koide et al., $[Al_5(Bu)_5(\mu_3-O)_2(\mu_3-OH)_2(\mu-OH)_2(\mu-O_2CPh)_2]$: *A Model for the Interaction of Carboxylic Acids with Boehmite,* Organometallics 14:4026–4029, 1995.

Y. Koide et al., *Alumoxanes as Cocatalysts in the Palladium–Catalyzed Copolymerization of Carbon Monoxide and Ethylene: Genesis of a Structure–Activity Relationship,* Organometallics 15(9):2213–2226, 1996.

J. I. Kroschwitz et al., *Encyclopedia of Polymer Science and Engineering, vol. 6, Emulsion Polymerization to Fibers, Manufacture,* John Wiley & Sons, pp. 322–382, 1985.

C. Landry et al., *Siloxy–Substituted Alumoxanes: Synthesis from Polydialkylsiloxanes and Trimethylaluminium, and Application as Aluminosilicate Precursors,* J. Mater. Chem. 3(6):597–602, 1993.

C. Landry et al., *From Minerals to Materials: Synthesis of Alumoxanes from the Reaction of Boehmite with Carboxylic Acids,* J. Mater. Chem 5(2):331–341, 1995.

P. LeBaron et al., *Polymer–Layered Silicate Nanocomposites: An Overview,* Applied Clay Science 15:11–29, 1999.

A. MacInnes et al., *Chemical Vapor Deposition of Gallium Sulfide: Phase Control by Molecular Design,* Chemistry of Materials 5(9):1344–1351, 1993.

A. MacInnes et al., *Indium Tert–Butylthiolates as Single Source Precursors for Indium Sulfide Thin Films: Is Molecular Design Enough?* J. Organometallic Chemistry 449:95–104, 1993.

K. Nakamae et al., *Studies on Mechanical Properties of Polymer Composites by X–Ray Diffraction: 3. Mechanism of Stress Transmission in Particulate Epoxy Composite by X–Ray Diffraction,* Polymer 33(13):2720–2724, 1992.

S. Pasynkiewicz, *Alumoxanes: Synthesis, Structures, Complexes and Reactions,* Polyhedron 9(2/3):429–453, 1990.

H. Schmidt et al., *Chemistry and Applications of Inorganic–Organic Polymers,* Mat. Res. Soc. Symp. Proc., vol. 73, pp 739–750, 1986.

H. Schmidt et al., *Inorganic–Organic Hybrid Coatings for Metal and Glass Surfaces,* American Chemical Society, pp. 331–347, 1995.

H. Schmidt et al., *Sol–Gel–Based Inorganic–Organic Composite Materials,* American Chemical Society, pp. 183–194, 1994.

N. Shahid et al., *Use of Carboxylate–Alumoxanes as Functionalized Cross–Linking Agents in the Preparation of Composite Resin Materials,* 221st ACS National Meeting, San Diego, CA, Apr. 1–5, 2001.

N. Shahid et al., *Use of Carboxylate–Alumoxanes as Functionalized Cross–Linking Agents in the Preparation of Composite Resin Materials,* ACS Joint Southeast–Southwest Regional Meeting, Dec. 6–8, 2000.

M. Stevens, *Polymer Chemistry, An Introduction,* Second Edition, Oxford University Press, pp 374–379, 1990.

C. Vogelson et al., *Inorganic–Organic Hybrid and Composite Materials Using Carboxylate–Alumoxanes,* Proceedings of the 9th Cimtec–World Ceramics Congress, pp 499–506, Jun. 14–19, 1998.

C. Vogelson et al., *Inorganic–Organic Hybrid and Composite Resin Materials Using Carboxylate–Alumoxanes as Functionalized Cross–Linking Agents,* Chem. Mater. 12(3):795–804, 2000.

C. Vogelson et al., *Fiber Reinforced Epoxy Resin Composite Materials Using Carboxylate–Alumoxanes as Cross–Linking Agents,* Mat. Res. Soc. Symp. Proc., vol. 581, pp 369–374, 2000.

C. Vogelson et al., *Epoxy Resin Materials Using Functionalized Carboxylate–Alumoxanes as Cross–Linking Agents,* ACS Meeting, Joint 55th Southwest/15th Rocky Mountain Regional Meeting, El Paso, Texas, Oct. 21–23, 1999.

C. Vogelson et al., *Inorganic–Organic Epoxy Resin Materials Using Functionalized Carboxylate–Alumoxanes as Cross–Linking Agents,* ACS Meeting, New Orleans, Louisiana, Aug. 21–26, 1999.

C. Vogelson et al., *Inorganic–Organic Epoxy Composite Materials Using Carboxylate–Alumoxanes,* ACS Meeting, Dallas, Texas, Mar. 29– Apr. 2, 1998.

C. Vogelson et al., Slides presented at 9th Annual World Ceramics conference in Florence, Italy, Jun. 1999.

G. Whitesides et al., *Molecular Self–Assembly and Nanochemistry: A Chemical Strategy for the Synthesis of Nanostructures,* Science 254:1312–1319, Nov. 1991.

B. Yoldas, *Alumina Gels that Form Porous Transparent $Al_2O_3$,* Journal of Materials Science 10:1856–1960, 1975.

* cited by examiner

Figure 1. Two-step surface-modification process.

Figure 2. Step 2, Step 3, and Step 4 of a potentially four-step surface-modification process illustrating the manner in which multiple generations of surface-modification can be carried out.

Figure 3. Step 2 and Step 3 of a three-step surface-modification process.

Figure 4. Step 2 and Step 3 of a three-step surface-modification process

Figure 5. Step 2 and Step 3 of a three-step surface-modification process with two Second-Generation Modifiers.

SURFACE MODIFIED PARTICLES BY MULTI-STEP MICHAEL-TYPE ADDITION AND PROCESS FOR THE PREPARATION THEREOF

This invention was made, at least in part, with funding from the National Science Foundation, Contract No. DMI-9901730, the Department of Energy, Contract No. DE-FG03-00ER82928 and the United States Navy, Contract No. N68335-01-C-0176. Accordingly, the U.S. government may have certain rights in this invention.

BACKGROUND OF THE INVENTION

This invention relates generally to surface-modified particles of materials such as aluminum oxyhydroxides, iron oxyhydroxides and clays, and methods for preparing the same.

Particulate fillers have long been known to impart desirable properties to a variety of polymeric materials. For example, mica increases the stiffness of phenol-formaldehyde plastics (A. King "Application of Fillers" in Plasticizers, Stabilizers, and Fillers, P. D. Ritchie ed, Iliffe Books, London, 1972.) Plate-like fillers have been known to improve the barrier properties of their composites (A. A. Gusev and H. R. Lusti, "Rational Design of Nanocomposites for Barrier Applications", Advanced Materials, 2001, Vol. 13(21), 1641–1643).

In many cases, it is advantageous to provide inorganic particles with an organic surface modification. Modifying the surface of particles that are added to a polymer matrix to form a composite can improve the wetting of the particles by the matrix and improve the dispersion of the particles in the matrix, thereby improving such properties of the composites as strength, toughness, and the ability to act as a barrier. Surface modifications can also improve the adhesion between the particles and the polymer, thereby improving the load transfer and the mechanical properties of the composite. For example, U.S. Pat. No. 4,091,164 teaches the modification of kaolin clays by mixing the clay particles with block copolymers of ethylene oxide and propylene oxide and then melting the polymers on the clay particles. Surface modifications have also provided particulate fillers the ability to bond with a matrix, as is described in e.g. U.S. Pat. No. 3,901,845, which teaches coupling of a mineral filler with a nylon matrix by an aromatic compound having a carboxyl group and a hydroxyl or amine group. PCT application WO 00/09578 and U.S. Pat. No. 6,369,183 B1 also teach surface modification of a filler followed by coupling of the filler to an organic matrix.

Polymer-clay composites have received much attention in the past five years (LeBaron, Wang and Pinnavaia, Applied Clay Science, 1999, 15, 11–29), and most of this work has focused on alkylammonium-exchanged smectite clays. Addition of surface modified clays to polymers improves the properties of the polymer. For example, adding a few percent loading of clay to nylon-6 increases the heat distortion temperature by 80° C. This increase makes structural applications possible under conditions where the pristine polymer would fail (deform). In another example, similar low loading levels of surface-modified clay increase the toughness and the tensile strength of thermoset materials such as elastomeric epoxies and polyurethanes. Furthermore, in glassy epoxy composites, clays greatly improve the yield strength and modulus under compression.

Although adding surface modified particles is an extremely important way of improving the properties of composite materials, the chemistries available for modifying a particle's surface in a single step are limited. Large carboxylic acids do not readily react with the surface of aluminum oxyhydroxides such as boehmite due to conformational and steric limitations. Likewise, large quaternary ammonium compounds diffuse very slowly into clay galleries, limiting the rate of production at which some surface-modified clays can be produced. Moreover, certain functional groups cannot be introduced in a one step modification because they undergo undesired side reactions. Many of these problems can be overcome by using a two-step process where a first molecule is attached to the particle and a sound molecule attaches to the first molecule by a chemical reaction. Multi-step reaction methods and particles are disclosed in concurrently-filed application Ser. No. 10/171,402.

One particularly useful class of reactions for adding organics to the surface of particles in a multi-step process is the Michael addition or Michael-type addition as known in the art and described further herein. Both Michael and Michael-type additions will be referred to as "Michael-type" additions.

Examples of surface modifications on particles follow. These examples do not teach a multi-step surface modification that uses a Michael or Michael-type addition.

U.S. Pat. No. 5,593,781 (Nass, et al.) describes surface modification of ceramic powders of nanometer size particles with small molecular weight organic compounds in a one-step process by dispersing the ceramic powder in water or an organic solvent and adding the low molecular weight organic compound.

Apblett et al. [Mat Res. Symp. Proc. Vol. 249 1992] describes the formation of carboxy substituted particles from the reaction of pseudoboehmite and carboxylic acids in a one-step process.

Landry et al. [J. Mater. Chem. 1995, 5(2), 331–341] describe the reaction of $[Al(O)(OH)]_n$ with carboxylic acids to form $[Al(O)_x(OH)_y(O2CR)_z]_n$ where $R=C_1-C_{13}$ and $2x+y+z=3$ using a one-step reaction.

U.S. Pat. No. 6,369,183 (Apr. 9, 2002) describes thermoset polymer networks formed from amine, hydroxyl, acrylic and vinyl substituted carboxylate-modified boehmite with low molecular weight polymer precursors.

U.S. Pat. No. 6,224,846, (Hurlburt and Plummer) describes the formation of a modified boehmite alumina by reaction of boehmite with a sulfonic acid at temperatures between 90° C. and 300° C. and preferably between 150° C. and 250° C. However, Hurlburt and Plummer do not teach the reaction of a sulfonic acid group with boehmite followed by reaction of another organic group with the attached sulfonic acid group.

U.S. Pat. No. 6,322,890 B1 (Barron and Obrey) describes supra-molecular alkylalumoxanes comprising a) an aluminum-oxide nanoparticle, b) a linkage unit, and c) an alkylalumoxane. The alkylalumoxanes used in Barron and Obrey are distinct from the carboxylato-alumoxanes of Landry et al. and serve as co-catalyst for alkene polymerizations (e.g. methylalumoxane (MAO)) by an organometallic reaction. Thus, Barron and Obrey teach the use of an aluminum oxide nanoparticle as a base on which to attach additional alumoxane units. Significantly, Barron and Obrey link these alumoxanes to the particle surface with organometallic bonds.

In U.S. Pat. No. 4,349,389, inorganic metal-containing pigments (particularly titanium dioxide) are made dispersible in thermoplastics and paints by first rendering the pigment hydrophobic by coating it with an alkylbenzene sulfonic acid, then coating it further with a thermoplastic polymer. Significantly, no covalent bond is created between the first surface-modifying molecules and the subsequent molecules that are simply adsorbed onto the modified surface.

U.S. Pat. No. 4,764,495 (Rice) describes surface modification of clay minerals by hydrogenation followed by reaction with molecules containing unsaturated carbon—carbon bonds. This is a two-step modification in which the first step entails reacting the particle with an inorganic gas rather than an organic compound. U.S. Pat. No. 4,900,767 teaches a method of modifying clays by contacting the clay with an organic monomer or prepolymer which is subsequently polymerized in the presence of carbon monoxide.

U.S. Pat. No. 5,814,407 (Richard, Vaslin and Larpent) describes forming latex or silica particles having N-alkylglycosyl groups on the surface by reacting an amine, thiol or phenol-functionalized latex particle or silanol-functionalized silica particle with an N-alkylacrylamidoglycosyl group. The objective of this patent is to produce materials that can find applications as detection agents in biology. The patent does not describe methods for two-step surface modifications to silica; silanol groups are inherent in the surface of silica and the origin of the surface-bound amine, thiol or phenol groups is unclear. At any rate, the present invention relates neither to —O—Si— anchor groups nor to silica surfaces.

There is a need for a multi-step process for producing surface-modified particles.

SUMMARY OF THE INVENTION

The present invention relates to a new class of surface modified particles and to a multi-step Michael-type addition surface modification process for the preparation of the same. The multi-step Michael-type addition surface modification process involves two or more reactions to produce surface-modified particles. These surface-modified particles are compatible with various host systems and have particular chemical reactivities that can be tailored. The initial step comprises the attachment of a reactive compound to the surface of the particle. The subsequent steps attach additional organic and inorganic compounds to the previously attached compounds through reactive groups. Specifically, these reactive groups are carbon—carbon pi bonds and carbon and non-carbon nucleophiles that are activated or can be activated to react via Michael or Michael-type additions.

Figure 2:
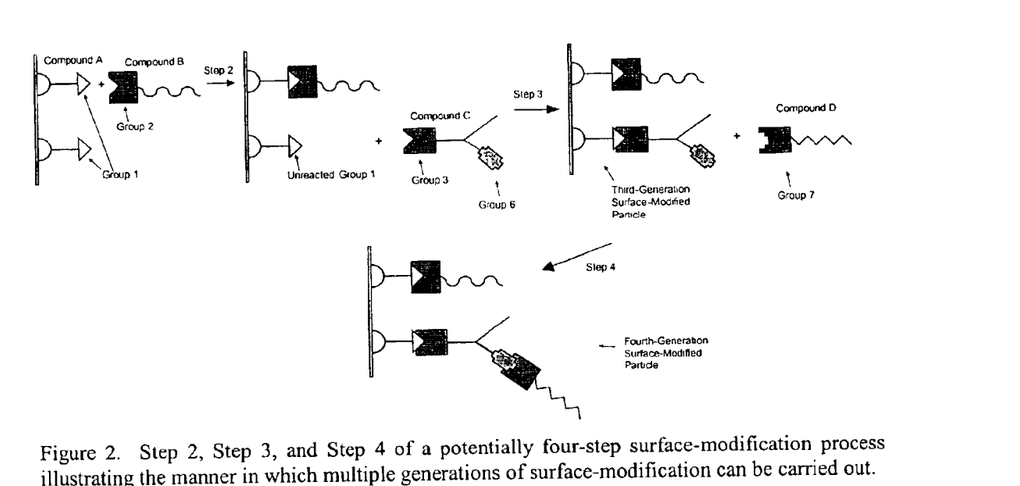
FIG. 2 shows steps 2, 3 and 4 of a potentially four-step surface-modification process illustrating the manner in which multiple generations of surface-modifications can be carried out.
Figure 3:
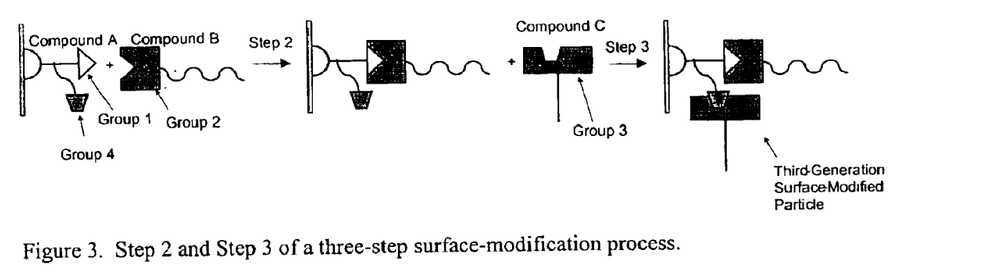
FIG. 3 shows steps 2 and 3 of a three-step surface-modification process.
Figure 4:
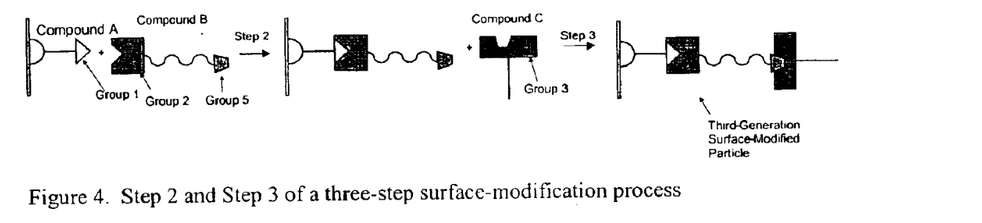
FIG. 4 shows steps 2 and 3 of a three-step surface modification process.

More specifically, the present invention describes processes to make particles whose surface is modified by a multi-step Michael-type addition surface modification process and the materials made by these processes. This multi-step Michael-type addition surface modification process involves two or more reactions. The initial step (Step 1 in Figures) comprises the attachment of one or more reactive compounds to the surface of the particle. As used herein, "reactive" means the group or compound undergoes the desired reaction or can be activated to undergo the desired reaction. These reactive compounds (for example, Compound A, FIG. 1, FIG. 2, FIG. 3 and FIG. 4; Compounds A and E, FIG. 5) contain reactive functional groups comprising at least an anchoring group (Anchor, FIG. 1) that reacts or can be activated to react with the surface of the particle, and another reactive functional group (Group 1, FIG. 1; Group 1 and Group 4, FIG. 3; Group 1 and Group 8, FIG. 5) that is available or can be activated for subsequent reactions. This reactive group is either an activated carbon—carbon pi bond or a non-carbon nucleophile or a carbon nucleophile. The subsequent (second) step attaches a second reactive compound (Compound B) to the previously attached Compound A via a Michael-type addition. Compound B contains at least one reactive group (Group 2, FIG. 1) that reacts or can be activated to react with the Group 1 of the Compound A forming a linkage (Step 2). Compound B may be organic, organometallic, and/or a coordination complex, or metal complex and may be largely inorganic (such as a phosphazene or siloxane oligomer) so long as it contains a suitable reactive functional group capable of reacting via a Michael-type reaction. Additional steps ($3^{rd}$, $4^{th}$, etc.) may be carried out following the same concept. For example, if a third step is carried out, this third step attaches a third compound (Compound C) to either Compound B or Compound A (FIGS. 2, 3, 4). Compound C contains at least a reactive group (Group 3) that reacts or can be activated to react either with unreacted Group 1 on Compound A (FIG. 2), with a second reactive group on compound A (Group 4, FIG. 3) or with a second reactive group of Compound B (Group 5, FIG. 4). It may be desired to use more than one compound with different reactive groups or different anchoring groups for any step or steps in the overall reaction (e.g. Step 1 in FIG. 5 and Step 3 in FIGS. 2, 3, and 5). Different compounds provide the ability to have more than one type of compound available for subsequent steps, and provide a particle with more than one type of functional group. Parallel reactions may also be used, where 2 or more different reactive compounds are reacted in step 1, and one, two or more reactive compounds are used in subsequent steps. It may also be desired to have unreacted groups at any stage of the process. Unreacted groups on the surface provide a way to tailor the density of modifiers on the surface. Unreacted groups may be made by blocking a reactive group with an unreactive group. It may also be desired to have nonreactive groups at any stage of the process. Nonreactive groups are those that are not reactive toward attaching subsequent reactive compounds. Nonreactive groups may be those that contain a fluorescent or other identifiable label, those that are biologically active, or those that contain other groups that may be useful for a given application.

The linkage between reactive groups (e.g. Group 1 and Group 2 of FIG. 1) used in this invention is organic and based on the Michael-type reaction as described below, although the compounds used may contain metallic elements, organometallic bonds, coordination complexes and other non-organic groups and elements. In a preferred embodiment, Compound A and subsequent Compounds B, C, etc., are organic compounds containing only organic groups (defined as containing carbon and composed exclusively of the elements C, H, S, O, N, P, B, Cl, Br, F, I).

Also provided herein are surface-modified particles. These particles contain one or more different groups on the surface, that in the most general sense, are linked to the particle through one or more different organic linkages formed from Michael-type reactions.

DETAILED DESCRIPTION OF THE INVENTION

The particles of this invention are finely divided materials having particle size less then 5 mm and a surface shell comprising at least 5% of aluminum oxyhydroxide, iron oxyhydroxide, scandium oxyhydroxide, a solid solution of aluminum oxyhydroxide and iron oxyhydroxide, clay or mixtures thereof. The core of the particles may be identical to or different from the surface shell, and it may be either an organic or inorganic material. The core may also be gelatinous or swollen polymer which would subsequently retract upon solvent removal or which would be eliminated by combustion to create essentially a hollow particle. Where the composition of the core differs from the composition of the shell, the particles are referred to as having a core-shell structure. One preferred class of particles is inorganic nanoparticles, i.e., those inorganic particles having no dimension greater than 200 nm.

As used herein, "alumoxane" is defined as an oligomeric aluminum compound represented by the general formulae $[(R)Al(O)]_n$ and $R[(R)Al(O)]_nAlR_2$, where R is an alkyl group such as methyl, ethyl, propyl, butyl or pentyl and n is an integer.

Preferred classes of particles are entirely inorganic. The most preferred class of particles is aluminum oxyhydroxides. Other preferred classes of particles are particles that do not contain silica. Another preferred class of particles are particles that do not have a surface shell of silica. Silica in the previous sentences does not refer to clays. Preferred anchoring groups are organic acids, salts of organic acids, and $NR_4^+$ where each R is H or alkyl or alkylaryl and at least one R is alkyl or alkylaryl. The surface-modified particles prepared by the method of this invention do not contain terminal glycosyl groups or alumoxanes. The reactions used to prepare the particles herein do not form thermoset polymer networks on the surface of the particles.

Aluminum oxyhydroxide is to be broadly construed to include any material whose surface is or can be processed to form a shell or layer of boehmite, including specifically aluminum metal, aluminum nitride, aluminum oxynitride (AlON), $\alpha$-$Al_2O_3$, $\gamma$-$Al_2O_3$, transitional aluminas of general formula $Al_2O_3$, boehmite ($\gamma$-AlO(OH)), pseudoboehmite ($\gamma$-AlO(OH)·x $H_2O$ where 0<x<1), diaspore ($\alpha$-AlO(OH)), and the aluminum hydroxides ($Al(OH)_3$) of bayerite and gibbsite. Thus, aluminum oxyhydroxide particles in this invention are any finely divided materials with particle sizes less than 5 mm and a surface shell comprising at least 5% of aluminum oxyhydroxide.

Boehmite and pseudoboehmite are aluminum oxyhydroxides of the general formula $\gamma$-AlO(OH)·x$H_2O$. When x=0 the material is called boehmite; when x>0 and the materials incorporate water into their crystalline structure they are known as pseudoboehmite. Boehmite and pseudoboehmite are also described as $Al_2O_3$·z$H_2O$ where, when z=1 the material is boehmite and when 1<z<2 the material is pseudoboehmite. The above materials are differentiated from the aluminum hydroxides (e.g. $Al(OH)_3$, bayerite and gibbsite) and diaspore ($\alpha$-AlOOH) by their compositions and crystal structures. Boehmite is usually well crystallized with a structure in accordance with the x-ray diffraction pattern given in the JCPDS-ICDD powder diffraction file 21-1307, whereas pseudoboehmite is less well crystallized and generally presents an XRD pattern with broadened peaks with lower intensities. For the purposes of this specification, the term 'boehmite' implies boehmite and/or pseudoboehmite. Thus, boehmite particles in this invention are any finely divided materials with a particle size less then 5 mm and a surface shell comprising at least 5% of boehmite and/or pseudoboehmite.

Iron oxyhydroxide is also known as lepidocrocite, $\gamma$-FeO(OH). Boehmite and pseudoboehmite have a crystal structure that is isomorphous with lepidocrocite. Solid solutions of iron oxyhydroxide and boehmite are also known and may be referred to as either material when there is not a great predominance of one metal or the other. Thus, iron oxyhydroxide particles in this invention are any finely divided materials with a particle size less then 5 mm and a surface shell comprising at least 5% of iron oxyhydroxide.

Clay generally describes crystalline, plate-like, 2-dimensional layered lattice silicates. Thus, for example, clays of the smectite, halloysite, illite, kaolinite, montmorillonite, palygorskite groups, and various other similar materials are here defined as clays. Thus, clay particles in this invention are any finely divided materials with a particle size less then 5 mm and a surface shell comprising at least 5% of clay.

In a preferred embodiment the particle core comprises metals (particularly aluminum alloys and iron alloys), inorganic oxides, inorganic oxyhydroxides, inorganic hydrates, inorganic salts, minerals, inorganic pigments, and glasses and the shell consists of aluminum oxyhydroxide. In another preferred embodiment, the core and shell of the materials are a solid solution of iron and aluminum oxyhydroxides. In a more preferred embodiment the core is aluminum, aluminum oxide, aluminum nitride, and other aluminum-containing minerals or salts and the shell is aluminum oxyhydroxide. In another more preferred embodiment the core is iron, iron oxide, an iron mineral or an iron-containing salt, and the shell is iron oxyhydroxide. In another more preferred embodiment, the core and shell are both composed of the same clay material. In the currently most preferred embodiment the core and shell of the particles are both of the same material comprising boehmite [AlOOH·x($H_2O$)] with a BET surface area of over 100 $m^2/g$.

The first step of the surface modification (Step 1 in Figures) comprises reactions that form a bond between the particles and the Anchor of Compound A. Bonds formed during Step 1 comprise covalent bonds, ionic bonds, hydrogen bonds, surface adsorption, and dipole—dipole interactions.

The second step (Step 2 in FIG. 1) comprises reactions that form a covalent, organic linkage between a group on Compound B and a group on the surface-anchored Compound A. The linkage is formed by a Michael-type reaction.

A limited number (1–10) of surface modification steps (Step 3, Step 4, etc.) may be carried out after Step 2 if further modification is needed. When Step 3 is carried out, this step attaches a third compound (Compound C) to either Compound B or Compound A (FIGS. 2, 3, 4). Compound C contains at least a reactive group (Group 3) that reacts (or can be activated to react) either with unreacted Group 1 on Compound A (FIG. 2), with a third group on compound A (Group 4, FIG. 3), or with a second group of Compound B (Group 5, FIG. 4). Step 2 and Step 3 (and additional steps) may be carried out as separate sequential reactions or in a single pot.

The definition of each Group 2, Group 3, etc. is the same as the definition of Group 1, below. Step 3 and additional steps, comprise the same reactions described for the Step 2. During each step a reactive group of one compound reacts with a reactive group of another compound. If desired, a compound containing a non-reactive group may be added. The process to select the pair of reactive groups to carry out the Step 3 or additional step is the same as described for the Step 2.

The above Steps and Compounds are now further defined in preferred embodiments.

Compound A is preferably a small molecule containing less than 40 carbon atoms and comprising at least a functional group (the Anchor) that reacts with the surface of the particle and a reactive group (Group 1) that reacts with Compound B. The reactive groups on Compound A and Compound B form a donor and acceptor pair of the Michael-type addition reaction. In a preferred embodiment Compound A is an organic group containing less then 14 carbon atoms, and in the most preferred embodiment Compound A is an organic group containing less than 9 carbon atoms.

The Anchor is defined as the functional group on the Compound A that reacts with the surface of the particles. In the preferred embodiment the Anchor selected from the group consisting of: a carboxylic acid group, a carboxylate salt, a phosphonic acid, a phosphonate salt, a sulfonic acid, an organic sulfate, a sulfonate salt, a boronic acid group, a boronate salt, an amino group, a quaternary ammonium salt, a phosphine group, a quaternary phosphonium salt, an hydroxyl group, a thiol, a disulfide, and a sulfonium salt. In a more preferred embodiment the Anchor is a carboxylic, sulfonic or phosphonic acid when the particles are aluminum oxyhydroxide or iron oxyhydroxide. In another more preferred embodiment, the Anchor is a protonated amine, quaternary ammonium salt, protonated phosphine or phosphonium salt when the particles are clay. In most preferred embodiments, the Anchor is a carboxylic acid when the particles are aluminum oxyhydroxide or iron oxyhydroxide and the Anchor is a quaternary ammonium salt when the particles are clay.

The second step (Step 2) of the surface functionalization process is the reaction between a reactive group on Compound B and the reactive group (Group 1) on the particle-anchored Compound A. During Step 2, Group 1 of Compound A reacts with Group 2 of Compound B forming a covalent, organic linkage bond via a Michael-type addition reaction.

Group 1 is a chemical entity capable of undergoing a reaction or being activated to react in a reaction, specifically a Michael-type reaction, and is either the acceptor (activated carbon—carbon pi bond) or the donor (nucleophile). If Group 1 is the electrophilic multiple bond for Michael-type addition it is an activated carbon—carbon pi bond of the type —C=C—Z, —C≡C—Z, —C=C—C=C—Z, and Z—C=C—Z' where Z and Z' are CHO, COR (including quinones), COOR, CONH$_2$, CONHR, CONR$_2$, CN, NO$_2$, SOR, SO$_2$R, SR and other electron withdrawing groups. If Group 1 is the nucleophile it is a non-carbon nucleophile or carbon nucleophile. Suitable non-carbon nucleophiles for Group 1 comprise alcohols, alkoxides, primary and secondary amines, hydrazines, hydroxylamines and their derivatives, phosphines, sulfides, thiols, thiolates, carboxylates, phenols, phenolates, thiophenols, thiophenolates, selenides, and tin derivatives. Carbon nucleophiles comprise carbanions from β-ketoesters, malonate esters, trialkylboranes, alkylsilyl derivatives, enolates, silyl enols, enamines, and the anions in Scheme 1. Michael-type donors and acceptors are known in the art. In this invention, Michael-type acceptors are preferably acrylic-type groups (acrylic, methacrylic, acrylamide). The Michael-type donors and acceptors form a Michael-type donor-acceptor pair. Michael and Michael-type additions are known in the art, and suitable substituents, and substitutions for those substituents are known to one of ordinary skill in the art. The terms above are as used in the art. All groups used in this invention are optionally substituted with elements and groups that do not prevent their desired reactions. Such substitutions are known in the art. Alkyl and alkenyl groups of substituents can be straight-chain, branched, or cyclic. Preferred alkyl groups have one to 6 carbon atoms, with methyl, ethyl and propyl groups being more preferred. Cyclic alkyl groups are preferably cyclohexyl or cyclopentyl groups. Preferred alkenes have one or two double bonds. Aryl groups contain one or more aromatic rings which are typically 5- or 6-member rings and which may be heterocyclic. Preferred aryl groups are optionally substituted phenyl groups which may be substituted with polar or charged (e.g., halogen, —COO$^-$, or —COOR groups). Compounds containing "Carboxylic acid" groups may contain one or more carboxylic acids. The example reactants given are intended to be representative and not exhaustive. Other examples are known to one of ordinary skill in the art.

Polymerization reactions indicate chemical reactions in which reactive monomers, oligomers, polymers, or reactive particles combine, through repeated, essentially identical chemical reactions, to form a chain with identifiable repeat units or a crosslinked network. The reactions and methods disclosed herein are not polymerization reactions. However, the particles formed may be used in a polymer system, for example.

Group 2 is a reactive functional group on Compound B selected from the functional groups of Group 1, such that a reaction between Group 1 on Compound A and Group 2 results in a covalent, organic bond between Compound A and Compound B via a Michael-type addition. Group 1 can either be the Michael-type acceptor or the donor. Group 2 can either be the Michael-type acceptor or donor, such that the Group 1 and Group 2 form an acceptor and donor pair.

The selection of appropriate compounds and conditions is readily understood by one of ordinary skill in the art in view of the disclosure herein and organic chemistry textbooks (for example, March, J., 2001; Furniss, B. 1989).

In a preferred embodiment the Michael-type donor is an amine and most preferably a primary amine. The Michael-type reaction may take place directly or be catalyzed through the use of a base, as known in the art (e.g. triethylamine). For secondary amines the reaction can be accelerated by using high temperatures or a base catalyst.

In the most preferred embodiment aluminum oxyhydroxide or iron oxyhydroxide particles are surface modified with acrylic acid, methacrylic acid, or 2-acrylamido-2-methylpropanesulfonic acid (Step 1) then reacted with a primary amine at room temperature (Examples 1, 4, 5, 8, and 9), or a secondary amine at 60–80° C., or a thiol in the presence of a base catalyst. In another most preferred embodiment montmorillonite is modified with 3-(acrylamidopropyl)trimethylammonium chloride in the first step and then reacted with a primary amine (Example 5).

In a preferred embodiment, particles after the first surface modification step containing reactive organic Groups 1 are water-soluble. These particles are partially reacted with a larger molecular weight Compound B containing reactive functional Groups 2 and this reaction makes the particle organic-soluble. The stoichiometry used in Step 2 is such that unreacted Groups 1 are left at the end of the reaction. The unreacted Groups 1 are then reacted with a Compound C containing a Group 3 in an organic solvent. (Example 1).

In another preferred embodiment, particles after the first modification step containing reactive organic Groups 1 are partially reacted with a relatively high molecular weight Compound B (greater than 400 amu, preferably greater than 1000 amu) containing reactive organic functional Groups 2 (Step 2). This Step attaches long (preferably about 18 atoms or longer) steric stabilizers to the particles. These stabilizers will keep the particles separate from each other during the Step 3. The stoichiometry used in the Step 2 is such that unreacted Groups 1 are left at the end of the reaction. The unreacted Groups 1 are then reacted with a relatively low-molecular weight Compound C (less than 400 amu, preferably less than 200 amu) containing two identical Groups 3 per molecule (Step 3). During this reaction no significant cross-linking occurs among particles because of the presence of the steric stabilizers introduced in Step 2 (Example 6).

All reactions above that are useful in preparing surface-modified particles may be used in this invention and form separate classes of reactions and methods. The following examples are non-limiting illustrations of some of the presently preferred embodiments of the invention.

THE EXAMPLES

Example 1

As illustrated in Scheme 2, acrylic acid (25.7 g, 0.36 mol) was added to 1.5 L of an 80° C. aqueous slurry containing 154.3 g (2.17 mol Al) of boehmite with a BET surface area of over 200 $m^2/g$ (e.g. Catapal A from Sasol). This mixture was heated at 80° C. for 20 hours and then spray-dried in a Yamato Pulvis Model GB-21 spray drier. It can be advantageous to convert the material to a dry powder to aid in transportation, storage, and handling. The dry material (15 g) was dispersed in 100 mL of water by gentle agitation. To this was added 9.8 g of liquid polyoxyalkyleneamine (XTJ-507 from Huntsman, 5 mmol) dispersed in about 100 ml of ethanol. After 40 minutes of stirring, the material was dried to a solid in a convection oven near room temperature. This dried material was then dispersed in acetone and 0.59 g (10 mmol) ethylene diamine was added to the solution. After 1 hour of stirring, 2.3 g (10 mmol) of HELOXY modifier 65 (a mono-functional glycidyl ether) was added while stirring the solution vigorously. After 1 hour, this product was cooled and used to prepare epoxy resins where it was found to improve the toughness of the product.

For example, epoxy resins composed of bis-phenol A diglycidyl ether (Epon 826) and 51 parts per hundred resin of a polyamide derivative of dimerized fatty acids (Versamid 140) were prepared by warming the ingredients to 45° C. and mixing them by hand for 1 minute with a glass stir rod to prepare roughly 25 g liquid resin mixture. This mixture was poured into a roughly 20 ml rectangular prism Teflon mold and cured for one hour at 60° C. followed by 1 hour at 100° C. before being cooled to room temperature and tested. Long rectangular rods were cut for flexural toughness testing; the toughness of the sample was taken as the area under the stress-strain curve divided by the nominal fracture surface area. Surface modified particles were added to the epoxy phase in their acetone dispersions and the acetone was removed by first stirring while heating for 3–4 hours on a hot plate then pulling vacuum while warming in a vacuum oven overnight. The toughness for the unmodified epoxy resin was 2.60 $J/cm^2$. Resins containing 1% and 2% (inorganic content) of the above surface-modified particles exhibited toughness values of 3.74, and 3.60, respectively.

Figure 1:
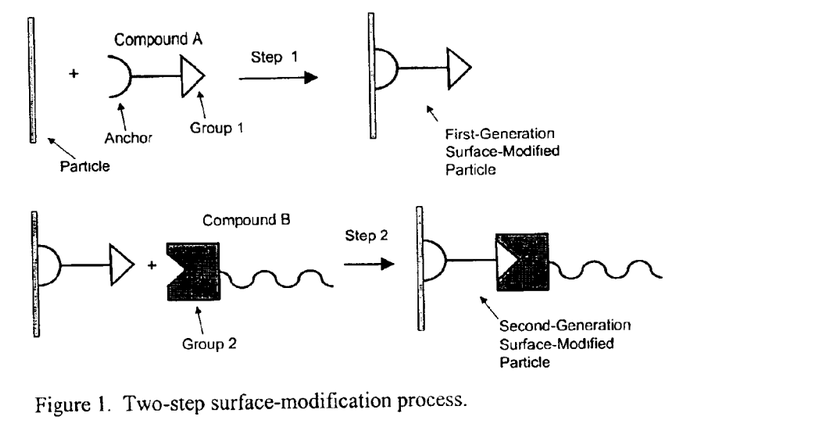
FIG. 1 shows a two-step modification process.

In Step 1 (not shown in Scheme 2) of this example, Compound A (as shown in FIG. 1) is acrylic acid and contains a carboxylic acid as the Anchor and an activated carbon—carbon double bond as Group 1. Compound B (polyoxyalkylene amine) contains an amine as Group 2. Step 2 is a Michael-type addition reaction. By limiting the amount of Compound B, not all of the activated carbon—carbon double bonds are used in Step 2. In Step 3, Compound C is ethylene diamine, which also reacts with any unreacted activated carbon—carbon double bonds. The product of Step 3 contains a free amino group (Group 6) which can undergo additional reactions as shown in FIG. 2. Without these surface modifications the Heloxy 65 would not have reacted readily with the particles since they would not both be dispersed/dissolved in the same solvent.

Example 2

This example illustrates first the conversion of the surface of alumina particles to boehmite, followed by modification of this surface with organic compounds.

In a 2 L pressure vessel provided with a mechanical stirrer, calcined α-alumina powder having an average particle size of 0.2 μm (RC—HP DBM without MgO alumina from Baikowski Malakoft) (500 g) was mixed with de-ionized water (1.3 L) and 30% wt ammonia solution (237 g) in order to facilitate a hydrothermal treatment of the alumina surface. The reaction was heated at 190° C. for 25–50 hr under vigorous stirring. At this temperature the internal pressure was about 300–350 psi. After cooling, the samples were dried in a vented oven at 90° C. overnight. The pH of the treated alumina in water was neutral, suggesting that all the ammonia evaporated during drying. This step forms a boehmite layer on the surface of the alumina as demonstrated by the x-ray diffraction pattern of the product.

The hydrothermally-treated alumina from the previous step was combined with acrylic acid (10.7 g, 0.1 mol) and water to form a 40 mL aqueous slurry. This mixture was heated at 80° C. for 20 hours and then spray-dried in a Yamato Pulvis Model GB-21 spray drier. It can be advantageous to convert the material to a dry powder to aid in transportation, storage, and handling. The dry material was dispersed in 30 mL of water by gentle agitation. To this was added 3.9 g of liquid polyoxyalkyleneamine (XTJ-507 from Huntsman, 5 mmol) dispersed in about 100 ml of ethanol. After 40 minutes of stirring, the material was dried to a solid in a convection oven near room temperature.

In Step 1 (not shown in Scheme 2) of this example, Compound A (as shown in FIG. 1) is acrylic acid and contains a carboxylic acid as the Anchor and an activated carbon—carbon double bond as Group 1. Compound B (polyoxyalkylene amine) contains an amine as Group 2. Step 2 is a Michael-type addition reaction. By limiting the amount of Compound B, not all of the activated carbon—carbon double bonds are used in Step 2. The product is a second generation surface-modified particle.

Example 3

This example illustrates first the conversion of the surface of AlN particles to boehmite, followed by modification of this surface with organic compounds.

In a glass reaction flask provided with a mechanical stirrer (magnetic type), aluminum nitride powder having an average primary particle size of 107 nm (Nanotechnologies, Austin, Tex.) (1 g) was mixed with de-ionized water (5 mL). The mixture was heated to boiling and the water was vaporized over the period of 10 minutes, leaving a dry powder. X-ray diffraction analysis of the dry powder indicated that a portion of the aluminum nitride was converted to boehmite. The XRD pattern for the powder contained peaks assigned to boehmite: 14.14°, 28.1°, 38.2°, 49.06°, 65.12°, and 71.74° 2-theta, as well as peaks assigned to AlN: 33.38°, 36.38°, 38.28°, 45.04°, 50.16°, 59.64°, 66.26°, 69.84° 71.68°, and 72.84° 2-theta. Adding more than 5 mL water (an amount that requires 30 minutes to vaporize) will result in converting all of the AlN to beohmite. Adding less than 5 mL of water (an amount requiring less than 10 minutes of time to vaporize) converts less of the AlN to boehmite. The external layer of boehmite was estimated to have an average thickness of 10 nm. The dry powder of AlN core, boehmite shell particles (0.44 g), acrylic acid (0.014 g) and methyl ether of hydroquinone (MEHQ, a radical reaction inhibitor) (500 ppm to acrylic acid) were added to xylene (17 g) and refluxed for 36 hours in the presence of an ambient atmosphere. The carboxylic acid group of acrylic acid reacts with the surface boehmite to form organic modified core/shell particles. At this point, the reaction was removed from the heat source and phenethylamine (0.008 g) was added to the particle/xylene mixture and stirred for 30 minutes. The xylene solvent was removed under vacuum and the surface modified particles were added (3% by weight) to epoxy resins and cured to make epoxy polymers with increased thermal conductivities.

In Step 1 (not shown in Scheme 2) of this example, Compound A (as shown in FIG. 1) is acrylic acid and contains a carboxylic acid as the Anchor and an activated carbon—carbon double bond as Group 1. Compound B (phenethyl amine) contains an amine as Group 2. Step 2 is a Michael-type addition reaction. The product is a second generation surface-modified particle.

Example 4

Iron oxyhydroxide (90 g, 1 mol Fe; lepidocrocite, γ-FeOOH) is dispersed in water using acrylic acid (12 g, 0.17 mol) (Al:acrylic-acid=6:1 molar ratio) and heated to 80° C. overnight. The resulting acrylate-modified lepidocrocite materials are then spray-dried in a Yamato Pulvis Model GB-21 spray drier. The spray-dried acrylate-modified lepidocrocite materials are then redispersed into water. Ethanolamine (10.4 g, 0.17 mol) is added to the dispersed surface modified lepidocrocite and the sol is then stirred at room temperature for two hours. The resulting material is a surface-modified lepidocrocite particle containing the adducted ethanolamine (e.g. lepidocrocite-O(CO)—CH$_2$CH$_2$NHCH$_2$CH$_2$OH).

In this example, compound A (as shown in FIG. 1) in Step 1 contains a carboxylic acid as the Anchor group and an activated carbon—carbon bond as Group 1. Compound B comprises an amine as Group 2. Step 2 reacts the activated carbon—carbon bond with the amine in a Michael-type addition reaction to give a second-generation surface-modified particle.

Example 5

20 g Montmorillonite (CEC=1.1 meq/g) was suspended in distilled water. 3-Acrylamidopropyl)trimethylammonium chloride (8.6 g, 0.042 mol; twofold excess with respect to the CEC) was added to the suspension. Monomethylether hydroquinone (MEHQ, 0.5 g) was added to inhibit acrylate polymerization. The suspension was heated to 80° C. overnight. The suspension was filtered and washed until the filtrate showed no evidence of chloride anion (via addition of silver nitrate to the filtrate). The ammonium modified montmorillonite was then re-suspended in water and heated to 70° C. Octadecylamine (5.1 g; 1:1 with respect to the ammonium ion modifier bound to the montmorillonite) was added to ethanol and heated to 70° C. to disperse the octadecylamine. The dispersed octadecylamine solution was then added to a heated (70° C.) aqueous ammonium ion modified montmorillonite and stirred for two hours. The resulting material was dried to a waxy solid.

In this example, compound A is 3-arylamidopropyl) trimethylammonium chloride (as shown in FIG. 1) in Step 1, and contains a quaternary ammonium ion as the Anchor group and an activated carbon—carbon double bond as Group 1. Compound B, octadecyl amine, comprises an amine as Group 2. Step 2 reacts the activated carbon—carbon double bond with the amine in a Michael-type addition reaction to give a second-generation surface-modified particle.

Example 6

A mixed lactic acid acrylic acid surface modified particle was prepared by slowly adding 100 mL of an aqueous solution containing 10 g (0.14 mol) acrylic acid and 25.2 g (0.28 mol) lactic acid to 0.5 L of aqueous slurry containing 154.3 g (2.14 mol Al) of boehmite with a BET surface area of over 200 m$^2$/g (e.g. Catapal A from Sasol). Monomethylether hydroquinone (MEHQ, 0.5 g) was added to inhibit acrylate polymerization. Additional water (to approximately 1.5 L) was added during acid addition and boehmite dispersion to control the viscosity of the mixture. This mixture was then heated at 80° C. for 14 hours while stirring gently. To this mixture was added about 1 L of an ethanol solution containing 220 g of a polyoxyalkyleneamine (e.g. XTJ-507 from Huntsman). This mixture was then thoroughly dried and taken up in anhydrous 2-butanone under an argon atmosphere. To this 2-butanone mixture was added 90 g (0.40 mol) of isophorone diisocyanate; which was allowed to react at 40° C. for 6 hours before allowing the 2-butanone to evaporate, leaving a hydrophobic waxy solid.

Figure 5:
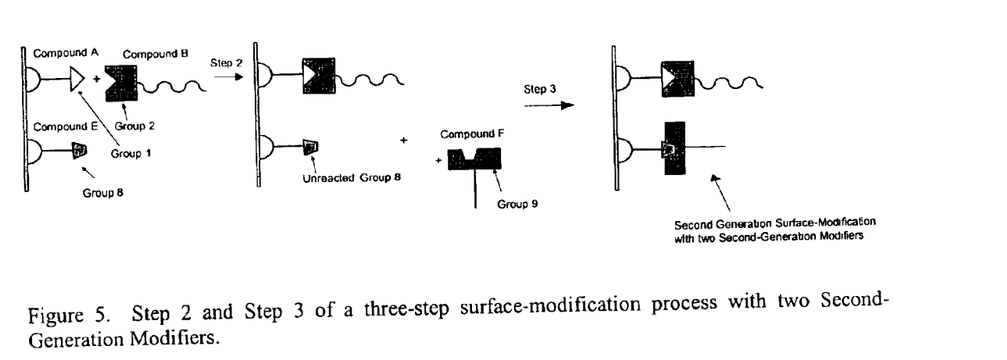
FIG. 5 shows steps 2 and 3 of a three-step surface-modification process with two first-generation modifiers and two second-generation modifiers.

In this example, illustrated in Scheme 3, compound A, acrylic acid, (as shown in FIG. 5) in Step 1 (not shown) contains a carboxylic acid as the Anchor group and an activated carbon—carbon double bond as Group 1. Compound E, lactic acid, (as shown in FIG. 5) in Step 1 (not shown) contains a carboxylic acid as the Anchor group and a hydroxyl group as Group 8. Compound B comprises an amine as Group 2. Step 2 reacts the activated carbon—carbon double bond with amine in a Michael-type addition reaction. Outside the scope of this invention a subsequent step then reacts the hydroxyl group (Group 8) and secondary amines from the Michael addition with the isocyanate group through an addition reaction with an α, β-unsaturated C—N bond to give a second-generation surface-modified particle with two second-generation modifiers.

Example 7

2-Acrylamido-2-methylpropanesulfonic acid (207 g, 1 mol) and boehmite (426 g, 6 mol Al) were heated to 60° C. for 4 hours in water under vigorous stirring. Monomethylether hydroquinone (MEHQ, 05 g) was added to inhibit polymerization. Water was added as necessary to maintain a low enough viscosity to ensure good mixing. The product was spray dried to a white powder in a Yamato Pulvis Model GB-21 spray drier.

This powder (10 g) was suspended in 100 mL of water. A polyoxyalkyleneamine (e.g., XTJ-507 from Huntsman) (2.4 g) was added under stirring. The mixture was stirred for two hours at room temperature. The material was isolated by drying in a vented oven at 55° C. overnight, and was isolated as a waxy solid.

In this example, illustrated in Scheme 4, compound A (as shown in FIG. 1) in Step 1 (not shown) contains a sulfonic acid as the Anchor group and an activated carbon—carbon double bond as Group 1. Compound B comprises an amine as Group 2. Step 2 reacts the activated carbon—carbon double bond with the amine in a Michael-type addition reaction to give a second-generation surface-modified particle.

Example 8

Acrylic acid, 25.7 g (0.36 mol), was added to 0.5 L of aqueous slurry containing 154.3 g (2.17 mol Al) of boehmite with a BET surface area of over 200 m/g (e.g. Catapal A from Sasol). Additional water was added during acid addition and boehmite dispersion to control the viscosity of the mixture. Monomethylether hydroquinone (MEHQ, 0.5 g) was added to inhibit acrylate polymerization. This mixture was heated at 80° C. for 8 hours and then spray dried in a Yamato Pulvis Model GB-21 spray drier. The dry material from the previous step was dispersed in 500 mL of water by gentle agitation. To this was added 13.3 g (0.007 mol) of a polyoxyalkyleneamine (e.g. XTJ-507 from Huntsman). After 40 minutes of stirring, 1.6 g (0.027 mol) ethylenediamine was added. After 40 minutes of stirring, 25 g (~0.027 mol) monomethacryloxypropyl-terminated polydimethylsiloxane (Gelest, 800–1000 MW) was then added and stirring continued for an additional 40 minutes. This product was dried in a warm ventilated oven to give a waxy solid. This product is useful for improving the barrier properties of silicone-containing polymers.

In Step 1 (not shown), Compound A (as shown in FIG. 1) contains a carboxylic acid as the Anchor and an activated carbon—carbon double bond as Group 1. Compound B contains an amine as Group 2. Step 2 is a Michael-type addition. By limiting the amount of Compound B, not all of the activated carbon—carbon double bonds are used in Step 2. In Step 3, Compound C is ethylene diamine, which also reacts with any unreacted activated carbon—carbon double bonds by Michael-type addition. The product of Step 3 contains a free amino group (Group 6) which can undergo additional reactions as shown in Scheme 5. In Step 4, a monomethacryloxypropyl-terminated polydimethylsiloxane (Compound D) containing an activated carbon—carbon double bond group (Group 7) reacts with the free amino groups of the partially reacted ethylene diamine by Michael-type addition to give a fourth-generation surface-modified particle.

Example 9

As illustrated in Scheme 6, 25.7 g (0.36 mol) acrylic acid was added to 0.5 L of aqueous slurry containing 154.3 g (2.17 mol Al) of boehmite with a BET surface area of over 200 m$^2$/g (e.g. Catapal A from Sasol). Additional water was added during acid addition and boehmite dispersion to control the viscosity of the mixture. Monomethylether hydroquinone (MEHQ, 0.5 g) was added to inhibit acrylate polymerization. This mixture was heated at 80° C. for 8 hours and then spray dried in a Yamato Pulvis Model GB-21 spray drier. The dry material from the previous step was dispersed in 500 mL of water by gentle agitation. To this was added 13.3 g (0.007 mol) of a polyoxyalkyleneamine (e.g. XTJ-507 from Huntsman). After 40 minutes of stirring, 1.6 g (0.027 mol) ethylenediamine is added. After 40 minutes of stirring, 25 g (0.027 mol) zinc acrylate is then added and stirring continued for an additional hour. This product was dried in a warm ventilated oven. This product is useful for improving the thermal stability of polyamides.

In Step 1 (not shown), Compound A (as shown in FIG. 1) contains a carboxylic acid as the Anchor and an activated carbon—carbon double bond as Group 1. Compound B contains an amine as Group 2. Step 2 is an addition reaction, in this case a Michael-type addition. By limiting the amount of Compound B, not all of the activated carbon—carbon double bonds are used in Step 2. In Step 3, Compound C is ethylene diamine, which also reacts with any unreacted activated carbon—carbon double bonds. The product of Step 3 contains a free amino group (Group 6) which can undergo additional reactions as shown in FIG. 2. In Step 4, zinc acrylate (Compound D) containing an acrylic group (Group 7) reacts with the free amino groups of the partially reacted ethylene diamine (as in Scheme 6) to give a fourth-generation surface-modified particle.

Example 10

As illustrated in Scheme 7, acrylic acid (25.7 g, 0.36 mol) was added to 1.5 L of an 80° C. aqueous slurry containing 154.3 g (2.17 mol Al) of boehmite with a BET surface area of over 200 m$^2$/g (e.g. Catapal A from Sasol). This mixture was heated at 80° C. for 20 hours and then spray-dried in a Yamato Pulvis Model GB-21 spray drier. The dry material (15 g) was then dispersed in 100 mL of water by gentle agitation and warmed to 60° C. To this was added 5.2 g of octadecylamine (19 mmol) dispersed in about 50 ml of warm ethanol. After 1 hour of stirring, the material was dried to a solid in a convection oven near room temperature. This dried material was then ground to a fine powder.

This product is more easily dispersed in polypropylene where it serves to increase the heat deflection temperature. The samples were prepared by mixing polypropylene and the above surface-modified particles in a Haake twin-screw extruder at 200° C. and then injection molded. The prepared samples contained 10% of surface-modified particles. Heat distortion temperature was measured according to ASTM D256. The polypropylene composite-was compared to pure polypropylene. The two samples showed a clear trend in which the composite material showed a lower distortion at a given temperature. At 60° C., pure polypropylene was displaced 0.8 mm while the composite was displaced 0.6 mm. At 93° C., pure polypropylene was displaced 1.7 mm while the composite was displaced 1.4 mm.

In Step 1 (not shown in Scheme 2) of this example, Compound A (as shown in FIG. 1) is acrylic acid and contains a carboxylic acid as the Anchor and an activated carbon—carbon double bond as Group 1. Compound B (octadecylamine) contains an amine as Group 2. Step 2 is a Michael-type addition reaction. The product is a second generation surface-modified particle.

Example 11

Boehmite with a BET surface area of over 200 m$^2$/g (e.g. Catapal A from Sasol) was dispersed in water using acrylic acid (Al:acrylic-acid=6:1 molar ratio). This mixture was heated at 80° C. for 20 hours and then spray-dried in a Yamato Pulvis Model GB-21 spray drier. It can be advantageous to convert the material to a dry powder to aid in transportation, storage, and handling. The dry material is then redispersed into water. A ethylenediamine modified propionic acid capped lactic acid oligomer (21 repeat units, —OC(CH$_3$)C(O)—, long) was added to ethanol and heated to 70° C. to disperse the oligomer. The dispersed ethylenediamine modified propionic acid-capped lactic acid oligomer in ethanol was then added (1:1 with respect to the acrylic acid) to a heated (70° C.) aqueous dispersion of the dry material from step 1 and stirred for two hours. The resulting material is a surface modified boehmite nanoparticle containing the adducted (via Michael-type addition) ethylenediamine modified propionic acid capped lactic acid oligomer (e.g. boehmite-O(CO)CH$_2$CH$_2$NHCH$_2$CH$_2$NHC(O)C(CH$_3$)O[C(O)—C(CH$_3$)O]$_{21}$ C(O)CH$_2$CH$_3$).

The material produced in this example was dispersed into chloroform and the mixture was added to a solution of polylactic acid in chloroform. The resulting mixture was slowly stirred and then applied to a glass substrate using a drawdown bar. The resulting material is clear showing excellent dispersion of the surface modified boehmite nanoparticles. The resulting nanocomposite has improved flexibility and barrier properties.

In Step 1 (not shown in Scheme 2) of this example, Compound A (as shown in FIG. 1) is acrylic acid and contains a carboxylic acid as the Anchor and an activated carbon—carbon double bond as Group 1. Compound B (ethylenediamine modified propionic acid capped lactic acid oligomer) contains an amine as Group 2. Step 2 is a Michael-type addition reaction. The product is a second generation surface-modified particle.

Example 12

Boehmite with a BET surface area of over 200 m$^2$/g (e.g. Catapal A from Sasol) was dispersed in water using acrylic acid (Al:acrylic-acid=12:1 molar ratio). This mixture was heated at 80° C. for 20 hours and then spray-dried in a Yamato Pulvis Model GB-21 spray drier. It can be advantageous to convert the material to a dry powder to aid in transportation, storage, and handling. The dry material was then redispersed into water. A polyoxyalkyleneamine (Huntsman XTJ-507 1:1 with respect to the acrylic acid) was added to the mixture then stirred at room temperature for two hours. The resulting material is a surface modified boehmite nanoparticle containing the adducted (via Michael-type addition) Huntsman XTJ-507 amine (e.g. boehmite-O(CO)CH$_2$CH$_2$NH(CH(CH$_3$)CH$_2$O)$_y$(CH$_2$CH$_2$O)$_x$CH$_3$) where x=6 and y=39.

The material produced in this example was dispersed into chloroform and the mixture was added to a solution of polylactic acid in chloroform. The resulting mixture was slowly stirred and then applied to a glass substrate using a drawdown bar. The resulting material was clear showing excellent dispersion of the surface modified boehmite nanoparticles. The resulting nanocomposite has improved flexibility and barrier properties.

In Step 1 (not shown in Scheme 2) of this example, Compound A (as shown in FIG. 1) is acrylic acid and contains a carboxylic acid as the Anchor and an activated carbon—carbon double bond as Group 1. Compound B (Huntsman XTJ-507 amine) contains an amine as Group 2. Step 2 is a Michael-type addition reaction. The product is a second generation surface-modified particle.

Example 13

Boehmite with a BET surface area of over 200 m$^2$/g (e.g. Catapal A from Sasol) is dispersed in water using propionic acid and p-aminobenzoic acid (Al:propionic-acid=12:1, Al:p-aminobenzoic acid=12:1 molar ratio). This mixture was heated at 80° C. for 20 hours and then dried. The dry material is then redispersed into water. A Michael acceptor (e.g. hydroxyethylmethacrylic acid) is then added to the mixture with a catalytic amount of triethylamine and heated to 70° C. The resulting mixture is spray dried giving an off-white powder that can be incorporated into epoxies improving hardness and barrier properties.

In this example, illustrated in Scheme 3, compound A, proprionic acid acid, (as shown in FIG. 5) in Step 1 (not shown) contains a carboxylic acid as the Anchor group and hydroxyl as Group 1. Compound E, p-aminobenzoic acid, (as shown in FIG. 5) in Step 1 (not shown) contains a carboxylic acid as the Anchor group and a hydroxyl group as Group 8. Compound B (hydroxyethylmethacrylic acid) comprises an activated carbon—carbon pi bond as Group 2. Step 2 reacts the hydroxyl with the activated carbon—carbon double bond (with a catalytic amount of triethylamine) in a Michael-type addition reaction. Compound F is the same as Compound B in this example (hydroxyethylmethacrylic acid).

Example 14

Boehmite with a BET surface area of over 200 m$^2$/g (e.g. Catapal A from Sasol) is dispersed in water using ethyleneglycol methacrylate phosphate (CH$_2$=CH(CH$_3$)CO$_2$CH$_2$CH$_2$OP(O)(OH)$_2$, (Al:phosphate=6:1 molar ratio). This mixture was heated at 80° C. for 20 hours and then spray-dried in a Yamato Pulvis Model GB-21 spray drier. It can be advantageous to convert the material to a dry powder to aid in transportation, storage, and handling. The dry material is then redispersed into water. Ethanolamine (1:1 with respect to the acrylic acid) is added to the dispersed surface modified boehmite and the sol is then stirred at room temperature for two hours.

In Step 1 (not shown in Scheme 2) of this example, Compound A (as shown in FIG. 1) is ethyleneglycol methacrylate phosphate and contains a phosphate as the Anchor and an activated carbon—carbon double bond as Group 1. Compound B (ethanolamine) contains an amine as Group 2. Step 2 is a Michael-type addition reaction. The product is a second generation surface-modified particle.

Although the description above contains many specificities, these should not be construed as limiting the scope of the invention, but rather providing illustrations of some of the preferred embodiments of the invention. For example, different synthesis methods that are known to one of ordinary skill in the art may be used with the teachings herein to synthesize surface-modified particles. Also, different reactants may be used than those specifically exemplified herein. Those or ordinary skill in the art will be aware of materials and methods that are functional equivalents of the specific materials disclosed herein. All such equivalents are encompassed by this invention. All references cited herein are incorporated by reference to the extent not inconsistent with the disclosure herewith.

where R = H, alkyl, aryl where $XY=NO_2$, COR, COOR, $COO^-$, COOH, $SO_2R$, SR, CN, CHO, SOR, $SO_2OR$, $SO_2NR_2$ and other masked carbonyls and other ylides and other carbanions

Scheme 1. Some carbon nucleophiles.

Scheme 2. An example of a two-step Michael addition followed by a third step of nucleophilic ring opening of epoxies.

Scheme 3. An example of surface modification by addition to a carbon-hetero atom multiple bond. Above, R is, in this case, the polyoxyalkyleneamine oligomer, and R' is the cycloaliphatic core of the isophorone diisocyanate.

Scheme 4. An example of a surface modification with a sulfonic acid where the linking group is the product of a Michael-type addition.

Scheme 5. An example of surface-modification using an inorganic polymer.

Scheme 6. An example of the surface-modification with an inorganic or organometallic compound.

Scheme 7. An example of surface-modification by Michael-type addition of octadecyl amine when R is the octadecyl group.

We claim:

1. A method of producing a surface-modified particle comprising:
   (a) reacting a particle having a particle size less than 5 mm and a surface shell comprising at least 5% aluminum oxyhydroxide, iron oxyhydroxide, scandium oxyhydroxide, a solid solution of aluminum oxyhydroxide and iron oxyhydroxide, clay or mixtures thereof with a first reactive compound having an anchoring group and a first reactive group which is a first member of a Michael-type donor- acceptor pair, whereby the anchoring group reacts with the particle, producing a first surface-modified particle; and
   (b) reacting said first surface-modified particle with a second reactive compound, said second reactive compound having a second reactive group which is a second member of the Michael-type donor-acceptor pair by a Michael-type addition, producing a second surface-modified particle.

2. The method of claim 1 wherein the second reactive compound is not an alumoxane and does not contain an N-alkylacrylamidoglycosyl group.

3. The method of claim 1, wherein the first reactive group is an activated carbon—carbon pi bond and the second reactive group is a carbon or non-carbon nucleophile.

4. The method of claim 2, wherein the first reactive group is an activated carbon—carbon pi bond and the second reactive group is a carbon or non-carbon nucleophile.

5. The method of claim 1, wherein step (b) is repeated one to ten times in reactions that are not polymerization reactions.

6. The method of claim 2, wherein step (b) is repeated one to ten times in reactions that are not polymerization reactions.

7. The method of claim 1, wherein the particle is a nanoparticle.

8. The method of claim 1, wherein the particle is selected from the group consisting of: aluminum oxyhydroxide, iron oxyhydroxide, a solid solution of aluminum oxyhydroxide and iron oxyhydroxide, and clay.

9. The method of claim 2, wherein the particle is selected from the group consisting of aluminum oxyhydroxide, iron oxyhydroxide, a solid solution of aluminum oxyhydroxide and iron oxyhydroxide, and clay.

10. The method of claim 1, wherein the particle is selected from the group consisting of aluminum oxyhydroxide, iron oxyhydroxide, and a solid solution of aluminum oxyhydroxide and iron oxyhydroxide.

11. The method of claim 2, wherein the particle is selected from the group consisting of aluminum oxyhydroxide, iron oxyhydroxide, and a solid solution of aluminum oxyhydroxide and iron oxyhydroxide.

12. The method of claim 1, wherein the particle is aluminum oxyhydroxide, iron oxyhydroxide, or a solid solution of aluminum oxyhydroxide and iron oxyhydroxide and the anchoring group is selected from the group consisting of: a carboxylic group, a sulfonic group and a phosphonic acid group.

13. The method of claim 2 wherein the particle is aluminum oxyhydroxide, iron oxyhydroxide, or a solid solution of aluminum oxyhydroxide and iron oxyhydroxide and the anchoring group is selected from the group consisting of: a carboxylic acid group, a sulfonic acid group and a phosphonic acid group.

14. The method of claim 1, wherein the particle is clay and the anchoring group is selected from the group consisting of: a protonated amine, a quaternary ammonium salt, a protonated phosphine and a phosphonium salt.

15. The method of claim 2, wherein the particle is clay and the anchoring group is selected from the group consisting of: a protonated amine, a quaternary ammonium salt, a protonated phosphine and a phosphonium salt.

16. The method of claim 1, wherein the particle has a core-shell structure, and the shell comprises at least 5% of a material selected from the group consisting of: aluminum oxyhydroxide, iron oxyhydroxide, a solid solution of aluminum oxyhydroxide and iron oxyhydroxide, and clay.

17. The method of claim 2, wherein the particle has a core-shell structure, and the shell comprises at least 5% of a material selected from the group consisting of: aluminum oxyhydroxide, iron oxyhydroxide, a solid solution of aluminum oxyhydroxide and iron oxyhydroxide, and clay.

18. The method of claim 1, wherein the particle has a core-shell structure and the core is aluminum oxide and the shell comprises at least 5% of aluminum oxyhydroxide.

19. The method of claim 2, wherein the particle has a core-shell structure and the core is aluminum oxide and the shell comprises at least 5% of aluminum oxyhydroxide.

20. The method of claim 1, wherein the particle is aluminum oxyhydroxide, iron oxyhydroxide, or a solid solution of aluminum oxyhydroxide and iron oxyhydroxide and the anchoring group is a carboxylic acid group.

21. The method of claim 2, wherein the particle is aluminum oxyhydroxide, iron oxyhydroxide, or a solid solution of aluminum oxyhydroxide and iron oxyhydroxide and the anchoring group is a carboxylic acid group.

22. The method of claim 1, wherein the particle is clay and the anchoring group is a quaternary ammonium salt.

23. The method of claim 2, wherein the particle is clay and the anchoring group is a quaternary ammonium salt.

24. The method of claim 1, wherein the anchoring group is selected from the group consisting of: a carboxylic acid group, a carboxylate salt, a phosphonic acid, a phosphonate salt, a sulfonic acid, an organic sulfate, a sulfonate salt, a boronic acid group, a boronate salt, an amino group, a quaternary ammonium salt, a phosphine group, a quaternary phosphonium salt, an hydroxyl group, a thiol, a disulfide, and a sulfonium salt.

25. The method of claim 24, wherein the anchoring group is selected from the group consisting of, carboxylic acid, sulfonic acid and phosphonic acid.

26. The method of claim 24, wherein the anchoring group is selected from the group consisting of: sulfonic and phosphonic groups.

27. The method of claim 24, wherein the anchoring group is selected from the group consisting of: ammonium ion, sulfonic and phosphonic groups.

28. The method of claim 1, wherein the particle is clay and the anchoring group is an ammonium ion.

29. The method of claim 1, wherein at least one of the reactive compounds is selected from the group consisting of: polyoxyalkyleneamines, alkylamines containing more than 7 carbon atoms, and aliphatic alcohols containing more than 7 carbon atoms.

30. The method of claim 2, wherein at least one of the reactive compounds is selected from the group consisting of: polyoxyalkyleneamines, alkylamines containing more than 7 carbon atoms, and aliphatic alcohols containing more than 7 carbon atoms.

31. The method of claim 1, wherein at least one of the reactive compounds is selected from the group consisting of: diamines, triamines, tetramines, and compounds containing activated carbon—carbon double bonds.

32. The method of claim 2, wherein at least one of the reactive compounds is selected from the group consisting of: diamines, triamines, tetramines, and compounds containing activated carbon—carbon double bonds.

33. The method of claim 1, wherein the second reactive group is an activated carbon—carbon pi bond and the first reactive group is a carbon or non-carbon nucleophile.

34. The method of claim 2, wherein the second reactive group is an activated carbon—carbon pi bond and the first reactive group is a carbon or non-carbon nucleophile.

35. The method of claim 1, wherein the particle is aluminum oxyhydroxide.

36. The method of claim 2, wherein the particle is aluminum oxyhydroxide.

37. The method of claim 1 wherein at least one of the first reactive group and the second reactive group is an electrophilic multiple bond for Michael-type addition and the other of the first reactive group and the second reactive group is a nucleophile for Michael-type addition.

38. The method of claim 2 wherein at least one of the first reactive group and the second reactive group is an electrophilic multiple bond for Michael-type addition and the other of the first reactive group and the second reactive group is a nucleophile for Michael-type addition.

39. The method of claim 1, further comprising:
   (c) reacting said second surface-modified particle with a third reactive compound, producing a third surface-modified particle.

40. The method of claim 2, further comprising:
   (c) reacting said second surface-modified particle with a third reactive compound, producing a third surface-modified particle.

41. The method of claim 39, further comprising:
   (d) reacting said third surface-modified particle with a fourth reactive compound, producing a fourth surface-modified particle.

42. The method of claim 41, further comprising:
   (e) reacting said fourth surface-modified particle with a fifth reactive compound, producing a fifth surface-modified particle.

43. The method of claim 40, further comprising:

(d) reacting said third surface-modified particle with a fourth reactive compound, producing a fourth surface-modified particle.

44. The method of claim 43, further comprising:

(e) reacting said fourth surface-modified particle with a fifth reactive compound, producing a fifth surface-modified particle.

45. The method of claim 1 wherein the first surface-modified particle is water-soluble.

46. The method of claim 45 wherein the second surface-modified particle is organic soluble.

47. The method of claim 1 wherein after step (b) unreacted first reactive groups which are a first member of a Michael-type donor-acceptor pair remain on the second surface-modified particle and wherein the method further comprises a step of reacting the remaining unreacted groups which are first members of the Michael-type donor-acceptor pair on the second surface-modified particle with a third reactive compound, said third reactive compound having a third reactive group, which is a second member of the Michael-type donor-acceptor pair of the unreacted groups on the surface second surface-modified particles and which third reactive compound is different from said second reactive compound, producing a third surface-modified article which is modified with two different surface groups.

48. The method of claim 47, wherein the third reactive compound further comprises a fourth reactive group which is a first member of a Michael-type donor-acceptor pair and wherein the method further comprises a step of reacting the third surface-modified particle with a fifth reactive compound, said fifth reactive compound comprising a fifth reactive group which is the second member of the Michel-Type donor-acceptor pair of the fourth reactive group, producing a fourth surface-modified particle which is modified with two different surface groups.

49. A method of producing a surface-modified aluminum oxyhydroxide particle comprising:

(a) reacting an aluminum oxyhydroxide particle with a first reactive compound having an anchoring group and a first reactive group which is a first member of a Michael-type donor-acceptor pair, whereby the anchoring group reacts with the particle, producing a first surface-modified particle; and (b) reacting said first surface-modified particle with a second reactive compound which is not an alumoxane and does not contain an N-alkylacrylamidoglycosyl group, said second reactive compound having a second reactive group which is a second member of the Michael-type donor-acceptor pair by a Michael-type addition, producing a second surface-modified particle.

50. A method of producing a surface-modified particle comprising:

(a) reacting a nonsilica-containing particle with a first organic reactive compound having an anchoring group and a first reactive group which is a first member of a Michael-type donor-acceptor pair, whereby the anchoring group reacts with the particle, producing a first surface-modified particle; and (b) reacting said first surface modified particle with a second reactive compound which is not an alumoxane and does not contain an N-alkylacrylamidoglycosyl group, said second reactive compound having a second reactive group which is a second member of the Michael-type donor-acceptor pair by a Michael-type addition, producing a second surface-modified particle.

51. A method of producing a surface-modified particle comprising:

(a) reacting a particle that does not have a shell containing silica with a first organic reactive compound having an anchoring group and a first reactive group which is a first member of a Michael-type donor-acceptor pair, whereby the anchoring group reacts with the particle, producing a first surface-modified particle; and (b) reacting said first surface modified particle with a second reactive compound which is not an alumoxane and does not contain an N-alkylacrylamidoglycosyl group, said second reactive compound having a second reactive group which is a second member of the Michael-type donor-acceptor pair by a Michael-type addition, producing a second surface-modified particle.

\* \* \* \* \*